Aug. 20, 1957  S. RADFORD  2,803,091
APPARATUS FOR THE SUB-IRRIGATION, SUB-AERATION
AND SUB-FERTILIZATION OF PLANTS
Filed Nov. 25, 1953
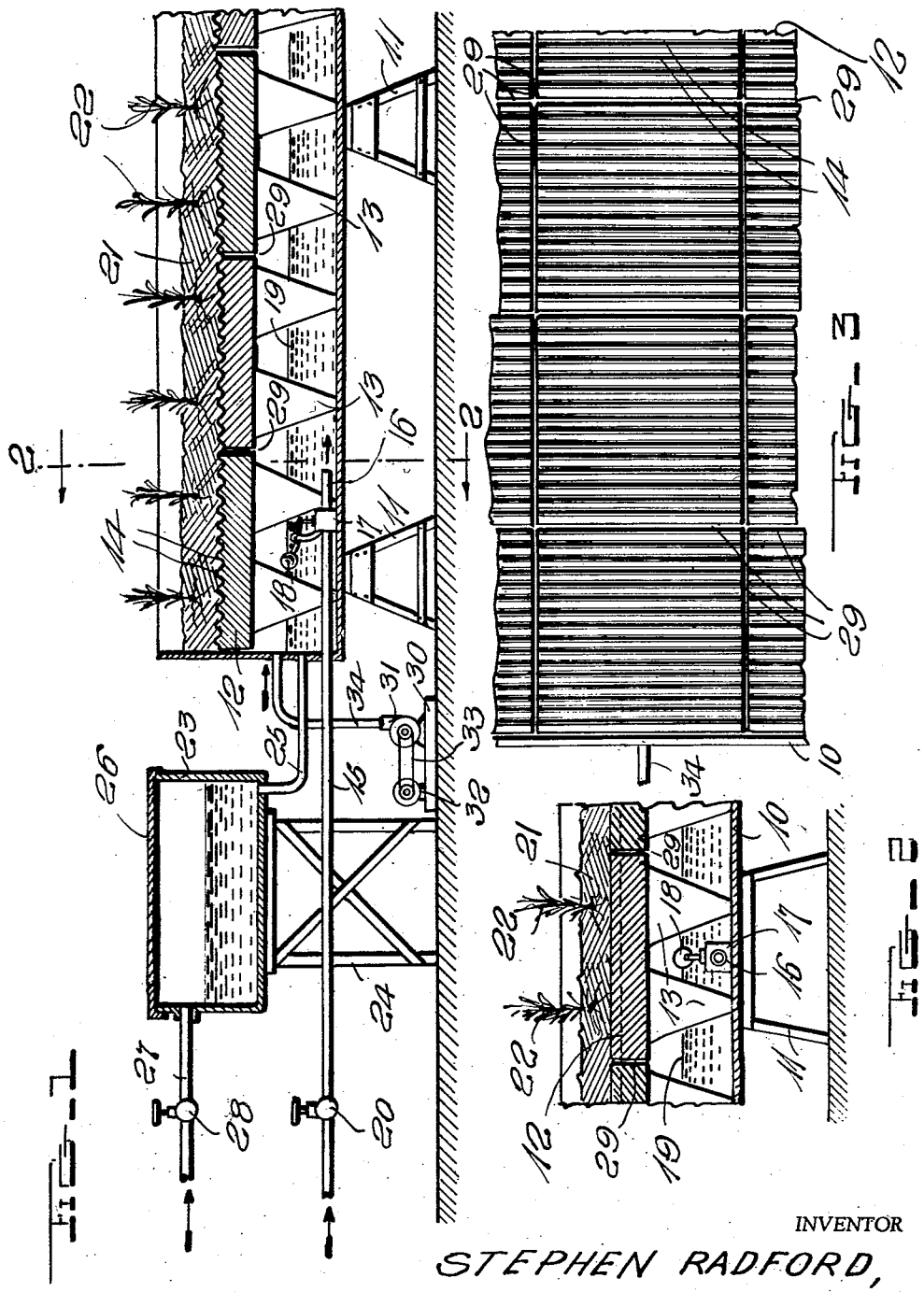
INVENTOR
STEPHEN RADFORD,
BY Felix A. Russell
ATTORNEY United States Patent Office 2,803,091
Patented Aug. 20, 1957

2,803,091

APPARATUS FOR THE SUB-IRRIGATION, SUB-AERATION AND SUB-FERTILIZATION OF PLANTS

Stephen Radford, Washington, D. C.

Application November 25, 1953, Serial No. 394,267

1 Claim. (Cl. 47—38)

The present invention relates to an apparatus for the sub-irrigation, sub-aeration and sub-fertilization of plants and it consists in the combinations, constructions and arrangements of parts herein described and claimed.

Generally there is provided an open-topped tank having a water supply pipe terminating therein which water supply pipe is provided with a float controlled valve whereby a constant predetermined level of water is maintained within the tank. A mixing tank is provided adjacent the aforementioned tank and is connected by pipe thereto preferably below the maintained water level in what may be termed the "growing tank." A blower is provided with a pipe which connects the same with the growing tank above the water level therein but beneath the body portions of a plurality of tiles mounted in the growing tank and provided with integrally formed feet which rest upon the bottom of the growing tank to support the main bodies thereof in vertical spaced relation to the surface of the water in such tank. The upper faces of the tiles are serrated to provide a greater surface thereon and are adapted to support a body of soil thereabove. The apparatus is such that a constant level of water is maintained in the growing tank which water is led by capillary attraction up and through the supporting legs of the tiles, thence through the bodies of the tiles to the soil. The blower is adapted to furnish air beneath the tiles which air may feed partially through the tiles themselves but more directly through the spaces between the contiguous tiles to the undersurface of the soil lying thereover. If desired, gases of a beneficial nature may be supplied to the soil through this means. Plant food and fertilizers may be mixed with water in the mixing tank and thereafter led by gravity to the growing tank to mix with the body of water therein contained. Such plant foods and fertilizers are then carried to the soil by capillary attraction through the legs and bodies of the aforementioned tiles.

It is accordingly an object of the invention to provide a novel method or system for the sub-irrigation, sub-aeration and sub-fertilization of soil for growing plants.

Another object of the invention is to provide an apparatus of the character set forth which is simple in construction, inexpensive to manufacture and yet effective and efficient in use.

Another object of the invention is to provide, in an apparatus of the character set forth, novel means for providing air and other gas to the sub-surface of a body of soil.

A further object of the invention is to provide, in a device of the character set forth, novel means for providing a constant source of water to the under-surface of a body of soil.

It is a further object of the invention to provide, in a device of the character set forth, novel means for adding plant food and fertilizer to a body of water from whence the same is lifted by novel means to the sub-surface of a body of plant soil.

Other and further objects of the invention will become apparent from a reading of the following specification taken in conjunction with the drawing, in which:

Figure 1 is a fragmentary vertical sectional view of an embodiment of the invention, Figure 2 is a fragmentary sectional view taken along line 2—2 of Figure 1, and Figure 3 is an enlarged fragmentary plan view of a plurality of tiles included as a part of the invention.

Referring more particularly to the drawing, there is shown therein an open-topped tank 10 which will be hereinafter referred to as a "growing tank" and which is mounted upon suitable supports such as horses 11, it being understood that the tank 10 will be of relatively large size such as are conventionally used in greenhouses or the like.

Mounted upon the floor of the tank 10 in adjacent abutting relation is a plurality of tiles each having a horizontally extending body 12 and a plurality of integrally formed dependent legs 13. The upper faces of the bodies 12 are serrated, as indicated at 14. A water supply pipe 15 extends from a suitable source (not shown), through a wall of the growing tank 10 and terminates therein adjacent the bottom wall thereof, as indicated at 16, and is provided with a valve generally indicated at 17 and controlled by a float 18. The float 18 is adapted to maintain a constant level of water within the growing tank 10, as indicated at 19 and the supply pipe 15 is provided with a manually controlled valve 20 exteriorly of the tank 10.

A body of plant soil 21 is mounted upon the upper serrated faces of the tiles and a plurality of growing plants 22 are rooted in the soil 21 in conventional manner.

In mixing tank 23 is mounted upon a supporting stand 24 adjacent one end of the growing tank 10 and a pipe 25 interconnects the lower portion of the tank 23 with the tank 10 below the water level 19 therein. The mixing tank 23 is provided with a removable cover 26 and a water pipe 27 is connected to the upper portion of the tank 23 and provided with a manually controlled valve 28 exteriorly of such tank. The bodies 12 of the tiles, while placed in close proximity to one another, nevertheless have appreciable spaces 29 therebetween.

Upon a platform 30 adjacent the growing tank 10 there is mounted a blower 31 powered by a motor 32 connected thereto by a pulley 33, such motor 32 being likewise mounted upon the platform 30. An air supply pipe 34 interconnects the blower 31 with the tank 10 above the water level 19 therein.

In operation, it will be apparent that with the manually controlled valve 20 in open condition, the valve 17 through the float 18 will act to maintain a constant level 19 of water in the tank 10 which level, while covering portions of the legs 13, will nevertheless lie below the bodies 12 of the soil-supporting tiles. Since the tiles are of porous material, water will be led from the lower portion of the growing tank 10 by capillary attraction through the legs into the bodies 12 and thence to the upper surfaces 14 where it will be absorbed by the soil 21 as needed for the plants 22. The serrated surfaces 14 will provide a greater surface of contact between the tiles and the soil and thus make for greater efficiency of the apparatus. When it is desired to add plant food and fertilizers to the body of water in the growing tank, it is only necessary to remove the cover 26 and place such fertilizers or food as the case may be within the tank 23 after which the valve 28 may be manipulated to allow water to flow into the tank 23 to thereby wash such fertilizers and/or food from the tank 23 through the pipe 25 to the body of water contained in the growing tank 10. To provide aeration to the under-surface of the soil 21, it is only necessary to operate the blower 31 which will thereupon provide air under pressure to the space between the water level 19 and the undersides of the bodies 12 of the tiles. Such air will then pass up through the openings 29 directly to the soil 21 and, in some degree through the porous tiles themselves to the soil 21. When desired, beneficial gases may be forced by the pump 31 through the pipe 34 to thus be led either directly through the openings 29 or indirectly through the tiles to the soil 21. As an example, of the use of the mixing tank 23, when the soil 21 needs amending by the application of lime thereto, such lime may be placed within the tank 23 and then fed to the soil in the manner above-described.

While but one form of the invention has been shown and described herein, it will be readily apparent to those skilled in the art that many minor modifications may be made without departing from the spirit of the invention or the scope of the appended claim.

What is claimed is:

An apparatus of the character described comprising an open-topped container, a plurality of soil-supporting porous tiles mounted in said container and having body portions in abutting relation to each other and having dependent legs resting on the bottom of said container, means for maintaining water at a constant level in said container to partially immerse said legs, means for feeding plant food and fertilizers to said container below said water level, and means for forcibly delivering air and beneficial gases to said container beneath the body portions of said tiles, said last-named means comprising a gas pump, and a pipe extending from said pump to a point in said container above said water level and below the body portions of said tiles.

References Cited in the file of this patent

UNITED STATES PATENTS

| | | |
|---|---|---|
| 784,756 | Pult | Mar. 14, 1905 |
| 1,222,648 | Marks | Apr. 17, 1917 |
| 1,247,166 | Steelquist | Nov. 20, 1917 |
| 2,060,735 | Krueger | Nov. 10, 1936 |
| 2,249,197 | Brundin | July 15, 1941 |
| 2,491,271 | King | Dec. 13, 1949 |
| 2,638,715 | Schroeder | May 19, 1953 |